United States Patent
Santhanam et al.

(10) Patent No.: US 6,971,038 B2
(45) Date of Patent: Nov. 29, 2005

(54) CLOCK GATING OF SUB-CIRCUITS WITHIN A PROCESSOR EXECUTION UNIT RESPONSIVE TO INSTRUCTION LATENCY COUNTER WITHIN PROCESSOR ISSUE CIRCUIT

(75) Inventors: Sribalan Santhanam, San Carlos, CA (US); Vincent R. von Kaenel, Palo Alto, CA (US); David A. Kruckemyer, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 648 days.

(21) Appl. No.: 10/061,695

(22) Filed: Feb. 1, 2002

(65) Prior Publication Data

US 2003/0149905 A1    Aug. 7, 2003

(51) Int. Cl.⁷ ................................................. G06F 1/32
(52) U.S. Cl. ...................... 713/324; 712/220; 713/322
(58) Field of Search ............................... 713/322, 324; 712/220

(56) References Cited

U.S. PATENT DOCUMENTS

| | | | |
|---|---|---|---|
| 4,061,933 A | 12/1977 | Schroeder et al. | |
| 4,797,849 A * | 1/1989 | Nakano | 708/654 |
| 5,459,736 A | 10/1995 | Nakamura | |
| 5,539,681 A * | 7/1996 | Alexander et al. | 713/321 |
| 5,689,517 A | 11/1997 | Ruparel | |
| 5,815,725 A | 9/1998 | Feierbach | |
| 5,831,462 A | 11/1998 | Witt et al. | |
| 6,223,282 B1 | 4/2001 | Kang | |
| 6,247,134 B1 | 6/2001 | Sproch et al. | |
| 6,272,667 B1 | 8/2001 | Minami et al. | |
| 6,318,911 B1 | 11/2001 | Kitahara | |
| 6,393,579 B1 * | 5/2002 | Piazza | 713/600 |
| 6,411,152 B1 | 6/2002 | Dobberpuhl | |
| 6,535,036 B1 | 3/2003 | Dobberpuhl | |
| 6,536,024 B1 * | 3/2003 | Hathaway | 716/6 |
| 6,822,481 B1 * | 11/2004 | Srikantam et al. | 326/93 |

FOREIGN PATENT DOCUMENTS

EP         522 413        1/1993

OTHER PUBLICATIONS

SiByte, "Target Applications." http://sibyte.com/mercurian/applications.htm, Jan. 15, 2001, 2 pages.

(Continued)

*Primary Examiner*—Chun Cao
*Assistant Examiner*—Albert Wang
(74) *Attorney, Agent, or Firm*—Garlick Harrison & Markison LLP

(57) ABSTRACT

A processor may include an execution circuit, an issue circuit coupled to the execution circuit, and a clock tree for clocking circuitry in the processor. The issue circuit issues an instruction to the execution circuit, and generates a control signal responsive to whether or not the instruction is issued to the execution circuit. The execution circuit includes at least a first subcircuit and a second subcircuit. A portion of the clock tree supplies a plurality of clocks to the execution circuit, including at least a first clock clocking the first subcircuit and at least a second clock clocking the second subcircuit. The portion of the clock tree is coupled to receive the control signal for collectively conditionally gating the plurality of clock, and is also configured to individually conditionally gate at least some of the plurality of clocks responsive to activity in the respective subcircuits of the execution circuit. A system on a chip may include several processors, and one or more of the processors may be conditionally clocked at the processor level.

16 Claims, 9 Drawing Sheets

OTHER PUBLICATIONS

SiByte, "SiByte Technology," http://sibyte.com/mercurian/technology.htm, Jan. 15, 2001, 3 pages.

SiByte, "The Mercurian Processor," http://sibyte.com/mercurian, Jan. 15, 2001, 2 pages.

SiByte, "Fact Sheet," SB-1 CPU, Oct. 2000, rev. 0.1, 1 page.

SiByte, "Fact Sheet," SB-1250, Oct. 2000, rev. 0.2, 10 pages.

Stepanian, SiByte, SiByte SB-1 MIPS64 CPU Core, Embedded Processor Forum 2000, Jun. 13, 2000, 15 pages.

Jim Keller, "The Mercurian Processor: A High Performance, Power-Efficient CMP for Networking," Oct. 10, 2000, 22 pages.

Tom R. Halfhill, "SiByte Reveals 64-Bit Core For NPUs; Independent MIPS64 Design Combines Low Power, High Performance," Microdesign Resources, Jun. 2000, Microprocessor Report, 4 pages.

SiByte, Letter from Anu Sudaresan, May 18, 2000, 1 page.

Stephany, et al., "FP 15.5: A 200 MHz 32b 0.5W CMOS RISC Microprocesor," Digital Semiconductor, Austin, TX, IEEE, 1998, pp. 15.5-1 to 15.5-9.

Santhanam, et al., "SA 18.6: A Low-Cost 300MHz RISC CPU with Attached Media Processor," Digital Equipment Corp., Palo Alto, CA, IEEE, 1998, pp. 18.6-1 to 18.6-9.

Montanaro, et al., "A 160-MHz, 32-b, 0.5-W CMOS RISC Microprocessor," IEEE Journal of Solid-State Circuits, vol. 31, No. 11, Nov. 1996, 12 pages.

Weiss, et al., "The On-Chip 3MB Subarry Based $3^{rd}$ Level Cache on an Itanium Microprocessor," IEEE, ISSCC 2002, Session 6, 3 pages.

Josephson, et al., "Test Methodology for the McKinley Processor," IEEE, ITC International Test Conference, Paper 21.1., 2001, pp. 578-585.

Santhanam, et al., Presentation for: "A 1GHz Power Efficient Single Chip Multiprocessor System For Broadband Networking Applications," Broadcom Corporation, Jun. 14, 2001, 19 pages.

Santanam, et al. "A 1GHz Power Efficient Single Chip Multiprocessor System For Broadband Networking Applications," Broadcom Corporation, Jun. 14, 2001, 4 pages.

* cited by examiner

CLOCK GATING OF SUB-CIRCUITS WITHIN A PROCESSOR EXECUTION UNIT RESPONSIVE TO INSTRUCTION LATENCY COUNTER WITHIN PROCESSOR ISSUE CIRCUIT

BACKGROUND OF THE INVENTION

1. Field of the Invention

This invention is related to the field of clocking of integrated circuits and, more particularly, to clock gating in integrated circuits.

2. Description of the Related Art

Digital circuits, including processors, systems-on-a-chip (SOCs), etc., are being designed to be operated at ever increasing frequencies. As the frequencies increase (and the number of transistors on a chip also increases), the power consumption of such circuits increases.

One attempt to manage power in integrated circuits includes clock gating. Generally, at a single, predefined level of abstraction in the integrated circuit, the clocks may be selectively gated based on whether or not corresponding circuitry is in use. By deactivating the clocks, the corresponding digital circuitry may be prevented from switching and thus from consuming dynamic power.

SUMMARY OF THE INVENTION

A processor may include an execution circuit configured to execute an instruction, an issue circuit coupled to the execution circuit, and a clock tree for clocking circuitry in the processor. The issue circuit is configured to issue an instruction to the execution circuit. Additionally, the issue circuit is configured to generate a control signal responsive to whether or not the instruction is issued to the execution circuit. The execution circuit includes at least a first subcircuit and a second subcircuit. A portion of the clock tree supplies a plurality of clocks to the execution circuit, the plurality of clocks including at least a first clock clocking the first subcircuit and at least a second clock clocking the second subcircuit. The portion of the clock tree is coupled to receive the control signal for collectively conditionally gating the plurality of clocks. Moreover, the portion of the clock tree is configured to individually conditionally gate at least some of the plurality of clocks responsive to activity in the respective subcircuits of the execution circuit.

Broadly speaking, an apparatus may include a first circuit including at least a first subcircuit and a second subcircuit and a clock tree having a clock input, a control input, and a plurality of clock outputs. At least a first clock output of the plurality of clock outputs is coupled to the first subcircuit and at least a second clock output of the plurality of clock outputs is coupled to the second subcircuit. The plurality of clock outputs are collectively conditionally gated from the clock input responsive to the control input. At least some of the plurality of clock outputs are individually conditionally gated from the clock input further responsive to circuitry monitoring activity in the respective subcircuits. A carrier medium comprising one or more data structures representing the apparatus is also contemplated.

BRIEF DESCRIPTION OF THE DRAWINGS

The following detailed description makes reference to the accompanying drawings, which are now briefly described.

Figure 1:
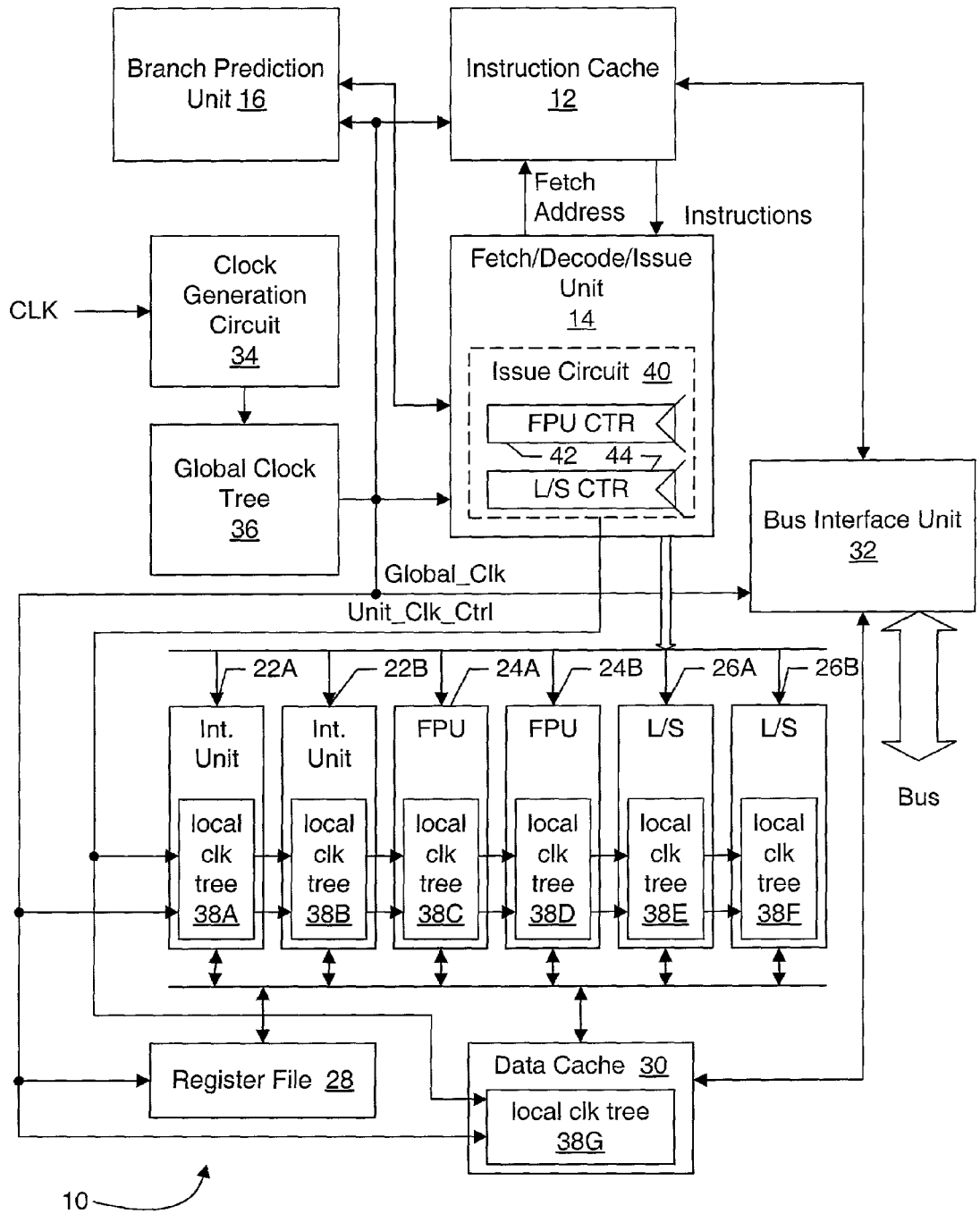
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Processor Overview

Turning now to FIG. 1, a block diagram of one embodiment of a processor 10 is shown. Other embodiments are possible and contemplated. In the embodiment of FIG. 1, the processor 10 includes an instruction cache 12, a fetch/decode/issue unit 14, a branch prediction unit 16, a set of integer execution units 22A–22B, a set of floating point execution units 24A–24B, a set of load/store execution units 26A–26B, a register file 28, a data cache 30, a bus interface unit 32, a clock generation circuit 34, and a global clock tree 36. The instruction cache 12 is coupled to the bus interface unit 32, and is coupled to receive a fetch address from, and provide corresponding instructions to, the fetch/decode/issue unit 14. The fetch/decode/issue unit 14 is further coupled to the branch prediction unit 16 and the execution units 22A–22B, 24A–24B, and 26A–26B. Specifically, the fetch/decode/issue unit 14 is coupled to provide a branch address to the branch prediction unit 16 and to receive a prediction and/or a target address from the branch prediction unit 16. The clock generation circuit 34 is coupled to receive an external clock CLK and is coupled to the global clock tree 36, which is coupled to provide a global clock (Global_Clk) to each of the instruction cache 12, the fetch/decode/issue unit 14, the branch prediction unit 16, the bus interface unit 32, the execution units 22A–22B, 24A–24B, and 26A–26B, the register file 28, and the data cache 30. Various circuits/units may include local clock trees (e.g. the local clock trees 38A–38G illustrated in FIG. 1 in the execution units 22A–22B, 24A–24B, and 26A–26B and the data cache 30). The fetch/decode/issue unit 14 is coupled to provide instructions for execution to the execution units 22A–22B, 24A–24B, and 26A–26B. The execution units 22A–22B, 24A–24B, and 26A–26B are generally coupled to the register file 28 and the data cache 30, and the data cache 30 is coupled to the bus interface unit 32.

In the illustrated embodiment, the fetch/decode/issue unit 14 includes an issue circuit 40 for issuing instructions to the execution units 22A–22B, 24A–24B, and 26A–26B. The issue circuit 40 may also provide unit clock control signals (Unit_Clk_Ctrl in FIG. 1). The issue circuit 40 may provide separate unit clock control signals for each execution unit, or for each type of execution unit (integer, floating point, load/store, etc.) in various embodiments. Additionally, the issue circuit 40 provides a unit control signal to the data cache 30 in the present embodiment.

Generally speaking, the fetch/decode/issue unit 14 is configured to generate fetch addresses for the instruction cache 12 and to receive corresponding instructions therefrom. The fetch/decode/issue unit 14 uses branch prediction information to generate the fetch addresses, to allow for speculative fetching of instructions prior to execution of the corresponding branch instructions. Specifically, in one embodiment, the branch prediction unit 16 include an array of branch predictors indexed by the branch address (e.g. the typical two bit counters which are incremented when the corresponding branch is taken, saturating at 11 in binary, and decremented when the corresponding branch is not taken, saturating at 00 in binary, with the most significant bit indicating taken or not taken). While any size and configuration may be used, one implementation of the branch predictors 16 may be 4 k entries in a direct-mapped configuration. Additionally, in one embodiment, the branch prediction unit 16 may include a branch target buffer comprising an array of branch target addresses. The target addresses may be previously generated target addresses of any type of branch, or just those of indirect branches. Again, while any configuration may be used, one implementation may provide 64 entries in the branch target buffer. Still further, an embodiment may include a return stack used to store link addresses of branch instructions which update a link resource ("branch and link" instructions). The fetch/decode/issue unit 14 may provide link addresses when branch instructions which update the link register are fetched for pushing on the return stack, and the return stack may provide the address from the top entry of the return stack as a predicted return address. While any configuration may be used, one implementation may provide 8 entries in the return stack.

The fetch/decode/issue unit 14 decodes the fetched instructions and queues them in one or more issue queues for issue to the appropriate execution units. The instructions may be speculatively issued to the appropriate execution units, again prior to execution/resolution of the branch instructions which cause the instructions to be speculative. In some embodiments, out of order execution may be employed (e.g. instructions may be issued in a different order than the program order). In other embodiments, in order execution may be used. However, some speculative issue/execution may still occur between the time that a branch instruction is issued and its result is generated from the execution unit which executes that branch instruction (e.g. the execution unit may have more than one pipeline stage).

The integer execution units 22A–22B are generally capable of handling integer arithmetic/logic operations, shifts, rotates, etc. At least the integer execution unit 22A is configured to execute branch instructions, and in some embodiments both of the integer execution units 22A–22B may handle branch instructions. In one implementation, only the execution unit 22B executes integer multiply and divide instructions although both may handle such instructions in other embodiments. The floating point execution units 24A–24B similarly execute the floating point instructions. The integer and floating point execution units 22A–22B and 24A–24B may read and write operands to and from the register file 28 in the illustrated embodiment, which may include both integer and floating point registers. The load/store units 26A–26B may generate load/store addresses in response to load/store instructions and perform cache accesses to read and write memory locations through the data cache 30 (and through the bus interface unit 32, as needed), transferring data to and from the registers in the register file 28 as well.

The instruction cache 12 may have any configuration and size, including direct mapped, fully associative, and set associative configurations. Similarly, the data cache 30 may have any configuration and size, including any of the above mentioned configurations. In one implementation, each of the instruction cache 12 and the data cache 30 may be 4 way set associative, 32 kilobyte (kb) caches including 32 byte cache lines. Both the instruction cache 12 and the data cache 30 are coupled to the bus interface unit 32 for transferring instructions and data into and out of the caches in response to misses, flushes, coherency activity on the bus, etc.

In one implementation, the processor 10 is designed to the MIPS instruction set architecture (including the MIPS-3D and MIPS MDMX application specific extensions). The MIPS instruction set may be used below as a specific example of certain instructions. However, other embodiments may implement the IA-32 or IA-64 instruction set architectures developed by Intel Corp., the PowerPC instruction set architecture, the Alpha instruction set architecture, the ARM instruction set architecture, or any other instruction set architecture.

It is noted that, while FIG. 1 illustrates two integer execution units, two floating point execution units (FPUs), and two load/store (L/S) units, other embodiments may employ any number of each type of unit, and the number of one type may differ from the number of another type.

Two Level Clock Gating

The clock generation circuit 34 is configured to generate a clock signal from the external clock for use by the circuitry illustrated in FIG. 1. The clock generation circuit 34 may include, for example, a phase locked loop (PLL) for locking the phase of the generated clock to the external clock. The PLL or other clock generation circuitry may multiply the frequency of the input clock signal to arrive at the frequency of the generated clock signal. Any desired clock generation circuitry may be used.

The generated clock signal is provided to the global clock tree 36. The global clock tree 36 buffers the generated clock signal for distribution to the various loads in the processor 10. Together with the local clock trees (e.g. the local clock trees 38A–38G illustrated in FIG. 1 as well as other local clock trees in other units, as desired, which are not illustrated in FIG. 1), the global clock tree 36 may form a clock tree for processor 10. Any buffer network may be used, as desired. In one embodiment, the clock tree is an H-tree design. While illustrated in FIG. 1 as a block providing a global clock signal for convenience in the drawing, it is understood that the buffer circuitry forming the global clock tree may generally be distributed throughout the silicon area occupied by the processor 10, and a plurality of global clock signals may be provided at various physical locations. The buffer network design may attempt to approximately match the delay from the input clock of the global clock tree to the various global clock signals.

The processor 10 may include two levels of clock gating for power management. A first, fine-grain level may be implemented at or near the lowest level in the local clock trees. The clock buffers at the lowest level may be conditional clock buffer circuits that receive an enable and conditionally gate the output clock based on the enable. For example, if the enable is in a first state indicating that the clock is not to be gated, the clock buffer circuit passes the oscillating input clock to the output clock. If the enable is in a second state indicating that the clock is to be gated, the clock buffer may hold the output clock steady in a state that insures that the receiving clocked devices (e.g. flip flops, latches, registers, etc.) hold their previous states. The first state may be a high voltage (e.g. representing a logical one) and the second state may be a low voltage (e.g. representing a logical zero) or vice-versa.

The fine grain level of clock gating may be controlled by logic local to the circuitry clocked by the conditional clock buffer circuits. Various subcircuits may be defined, and each may be clocked by one or more of the conditional clock buffer circuits. The logic may evaluate various inputs on a clock-cycle by clock-cycle basis to determine if the subcircuit will be in use during the next clock cycle, and either enable or disable the corresponding conditional clock buffer circuit(s) accordingly. For example, the subcircuits may be different pipeline stages. If the preceding pipeline stage to a first pipeline stage is idle during a clock cycle, then the first pipeline stage may be idle for the next clock cycle (and thus may not be clocked in the next clock cycle). Alternatively, the subcircuits may be different processor resources which may or may not be used during execution of an instruction. For example, the floating point unit may include an adder circuit, a multiplier circuit, and an approximation circuit. If the instruction being executed is, e.g., a floating point add, the multiplier circuit and the approximation circuit need not be used.

A second, coarser-grain level of clock gating may also be implemented in which a local clock tree supplying a circuit comprising two or more subcircuits at the fine grain level is conditionally gated as a whole. Since the local clock tree is gated, the local clocks at the lowest level of that local clock tree are collectively gated. The second, coarser grain level of clock gating may provide additional power savings by reducing the power dissipated in the local clock tree and in the local, fine grain conditional clock buffers. Additionally, the second level of clock gating may reduce power dissipation by gating any unconditionally generated local clocks, if the circuit includes such clocks. Still further, the second level of clock gating may reduce power dissipation in the control section and data paths of the unit.

For example, in one embodiment the processor 10 may provide for gating the local clock tree of one of the FPUs 24A–24B if a floating point instruction is not issued to that FPU. Once a floating point instruction is issued to a given FPU, that FPU may be clocked at the coarse grain level at least long enough to cover the latency of the floating point instruction (that is, the local clock tree is enabled, or not gated at the coarser level, for a number of consecutive clock cycles greater than or equal to the latency of the dispatched floating point instruction). If another floating instruction is issued, the number of consecutive clock cycles that the FPU local clock tree is enabled is extended to cover the latency of the subsequently issued FPU instruction. In one embodiment, the issue circuit 40 generates one or more control signals to the FPUs 24A–24B which control the coarse level of clock gating.

In one implementation, the issue circuit 40 may include one or more FPU counters 42 for counting the cycles of latency of an issued floating point instruction. The issue circuit 40 may initialize the FPU counter 42 in response to issuing a floating point instruction, and may use the value of the counter to generate the unit clock control signals for the FPUs 24A–24B. In one implementation, a single FPU counter 42 may be used and the local clock trees 38C–38D of the FPUs 24A–24B may be enabled/disabled together. Alternatively, individual FPU counters 42 may be associated with each FPU 24A–24B and the corresponding unit clock control signal may be generated accordingly. In one implementation, the FPU counter 42 is initialized to a value greater than or equal to the latency of the floating point instruction and is decremented each clock cycle. If the FPU counter 42 is non-zero, the local clock tree or trees 38C–38D are enabled. If the FPU counter 42 is zero, the local clock tree or trees 38C–38D are disabled. Other embodiments may initialize the counter to zero and increment the counter each clock cycle. If the counter is less than the latency, the local clock tree or trees 38C–38D are enabled. If the counter is greater than the latency, the local clock tree or trees 38C–38D are disabled.

In one implementation, the latency of the floating point instructions varies dependent on the type of instruction. The FPU counter 42 may be initialized to a value greater than or equal to the longest latency FPU instruction. Alternatively, the FPU counter 42 may be initialized to a value dependent on the latency of the issued floating point instruction.

The load/store units 26A–26B and/or the data cache 30 may be controlled in a similar fashion by the issue circuit 40, using one or more load/store (L/S) counters 44. In one implementation, only the clocking of the data cache 30 is controlled at the coarse grain level. In response to the issue of a load/store instruction to one of the L/S units 26A–26B, the L/S counter 44 may be initialized. Based on the value of the counter, the coarse grain level clock gating may be enabled or disabled. Alternatively, the L/S units 26A–26B may be controlled at the coarse grain level as well.

In one embodiment, the integer units 22A–22B may not be controlled at the coarse grain level. Thus, processor 10 may include some circuits which employ fine grain clock gating but which do not employ coarse grain clock gating.

In one implementation, the fine grain level of clock gating in the FPUs 24A–24B may result in approximately 30% power savings in processor 10 for certain programs. The coarse grain level of clock gating may result in approximately 15% additional power savings. Of the 15%, it is believed that 10% may be achieved from the elimination of switching in the local clock tree and 5% from a combination of the elimination of switching in unconditional clocks at the fine grain level and from the elimination of switching in situations in which the fine grain level may not detect that a given subcircuit is not in use.

Generally, as used herein, a clock tree is any buffer network for buffering an input clock to produce local clocks for various circuitry.

Figure 2:
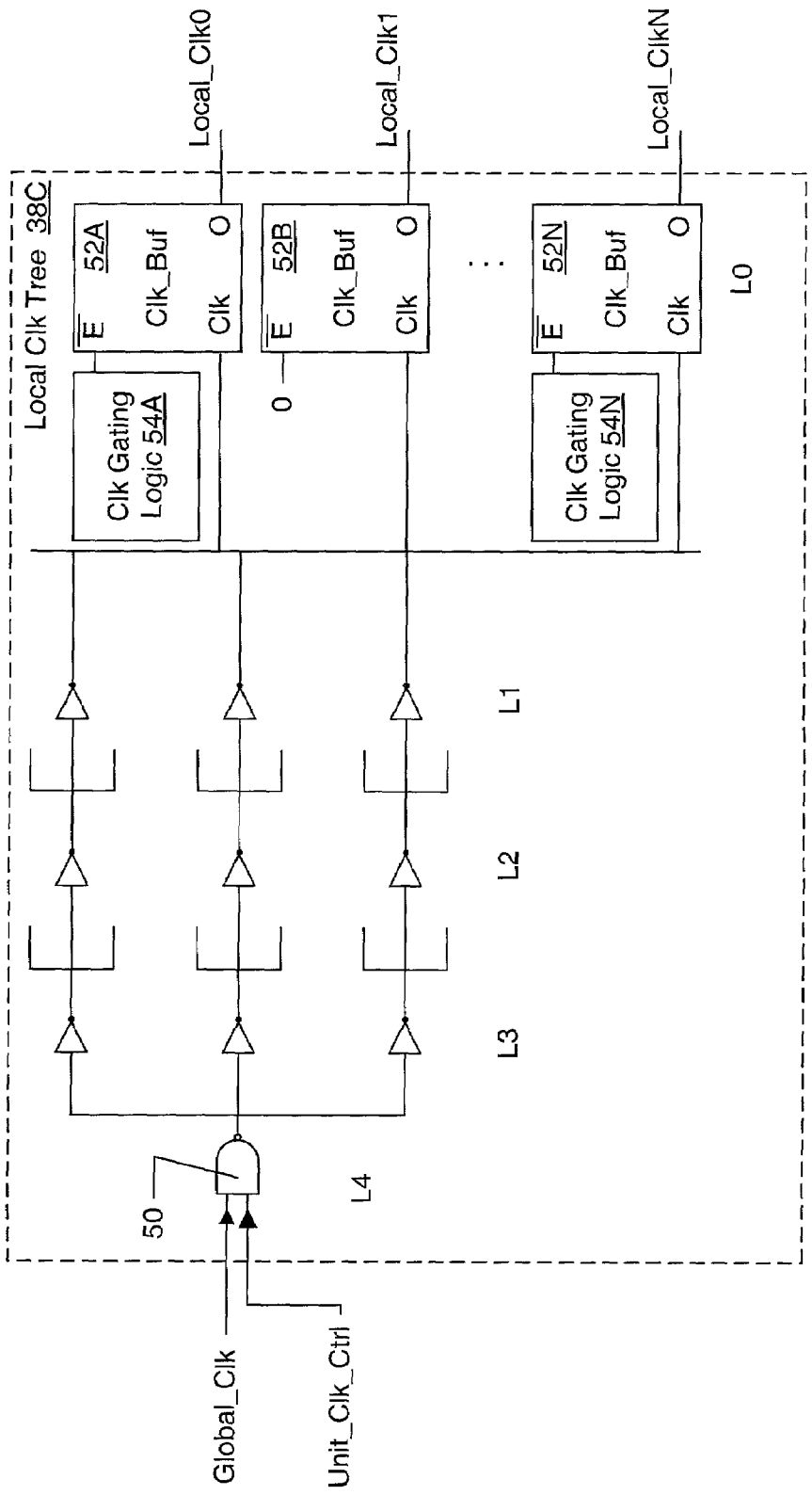
FIG. 2 is a circuit diagram illustrating one embodiment of a local clock tree.

Turning now to FIG. 2, a circuit diagram illustrating one embodiment of a local clock tree 38C which may be employed in one embodiment of the FPU 24A is shown. Other local clock trees 38A–38B and 38D–38G may be similar. Other embodiments are possible and contemplated. In the embodiment of FIG. 2, the local clock tree 38C includes several levels of buffers (labeled L0–L4 in FIG. 2, with L0 being the lowest level at which the local clocks are generated and provided to clocked circuits within the various subcircuits of the FPU 24A). Each level of buffers is coupled to the next higher level of buffers. In the illustrated embodiment, each of the levels L1–L3 comprises inverter circuits, although non-inverting buffer circuits may be used in other embodiments. Level L0 comprises conditional clock buffer circuits (e.g. circuits 52A–52N illustrated in FIG. 2) coupled to the output of the L1 level. In the illustrated embodiment, the outputs of the L1 buffers are connected together, although other embodiments may connect individual L1 buffer outputs to clock inputs of various conditional clock buffer circuits 52A–52N.

The L4 buffer level includes a logic gate 50 (a NAND gate in this embodiment). The logic gate 50 combines the global clock signal and the unit clock control signal for the corresponding unit (e.g. FPU 24B, for the local clock tree 38C). Thus, if the unit clock control signal is a logical zero, the output of the NAND gate 50 is a steady logical one even if the global clock signal oscillates. In other words, the local clock tree is gated at the coarse level. If the unit clock control circuit is a logical one, the oscillating global clock signal passes through the NAND gate 50. In other words, the local clock tree is not gated at the coarse level. Alternatively, the L4 buffer level may include conditional clock buffer circuits similar to the circuits 52A–52N.

While a NAND gate 50 is used in the embodiment of FIG. 2, other embodiments may use other gates (e.g. AND, NOR, OR, etc.) depending on the buffer level at which the gating occurs and depending on the logic level desired for the holding the local clocks in steady state. For example, clock gating at the L3 level may use a NOR gate and the unit clock control signal may be asserted to a logical one to gate the clocks and deasserted to a logical zero to allow the oscillating clock signal to pass through (thus permitting local clock generation). Any logic gate or gates may be used, as desired, including any Boolean equivalents of the above gates.

At each level of buffering, a given buffer may be coupled to some number of buffers at the next lower level. The fan-out from a given buffer may depend on the characteristics of the transistors in the semiconductor technology used, the delay associated with wire resistance and capacitance, etc. Generally, at some number of fan-out, insertion of a buffer may result in reduced delay overall rather than allowing a higher fan out. For example, a fan out of around 3 may be provided between buffer levels. Any fan out may be used in other embodiments. For example, a fan out of 4 or 5, or 2, may be selected in other embodiments.

It is noted that, while one NAND gate 50 is shown at the L4 level in the local clock tree 38C, more than one gate may be used, as desired. It is noted that, while the coarse grain level of clock gating is implemented at the L4 level in the illustrated embodiment, the coarse grain level may be implemented at other levels, as desired. The number of buffer levels between the coarse grain and fine grain level of clock gating may be varied.

As mentioned above, the conditional clock buffers 52A–52N may generate the local clock signals conditionally based on an enable input. The enable input may be generated by observing various activity in the unit, and by generating an enable for the corresponding conditional clock buffers 52A–52N based on whether a corresponding subcircuit is to be in use in the next clock cycle. For example, clock gating logic 54A may be coupled to provide the enable to conditional clock buffer 52A, and clock gating logic 54N may be coupled to provide the enable to the conditional clock buffer 52N. Other local clocks may be unconditional at the fine grain level. For example, the conditional clock buffer 52B has its enable input tied to a logical zero (enabled in this example, as indicated by the bar over the E on the conditional clock buffer circuits 52A–52N). The conditional clock buffer circuitry is still used in this case to minimize delay differences between the unconditional local clocks and the conditional local clocks. In other embodiments, the conditional clock buffer may not be used for unconditional clocks.

The enables mentioned above are generated based on whether or not gating of the individual local clocks is desired. Similarly, the unit clock control signal may be generated based on whether or not gating of the local clocks collectively is desired. In this embodiment, the gating of the local clocks collectively occurs by gating the input clock to the local clock tree. A first clock is "gated" if it is held in steady state even though a source clock of the first clock is oscillating, and is not gated if it is oscillating in response to the source clock. Viewed in another way, the first clock is conditionally generated from the source clock. The first clock may be referred to as "disabled" if it is not being generated from the source clock, or "enabled" if it is being generated from the source clock.

Each local clock is coupled to one or more clocked circuits within a given subcircuit. For example, in one embodiment, an FPU 24A–24B may include 16 local clocks for the multiplier subcircuit, 15 local clocks for the adder subcircuit, 12 local clocks for the approximation subcircuit, and 20 local clocks for control circuitry. Other embodiments may vary the number of local clocks in any subcircuit to be greater or less than those listed.

While the embodiment shown in FIG. 2 includes the conditional clock buffers at the lowest level (L0) of the local clock tree, other embodiments may include additional levels of buffering below the conditional clock buffer level. Additionally, the conditional clock buffer circuits 52A–52N may be implemented as NAND gates or other logic gates similar to the logic gates 50 at the LA level.

Figure 3:
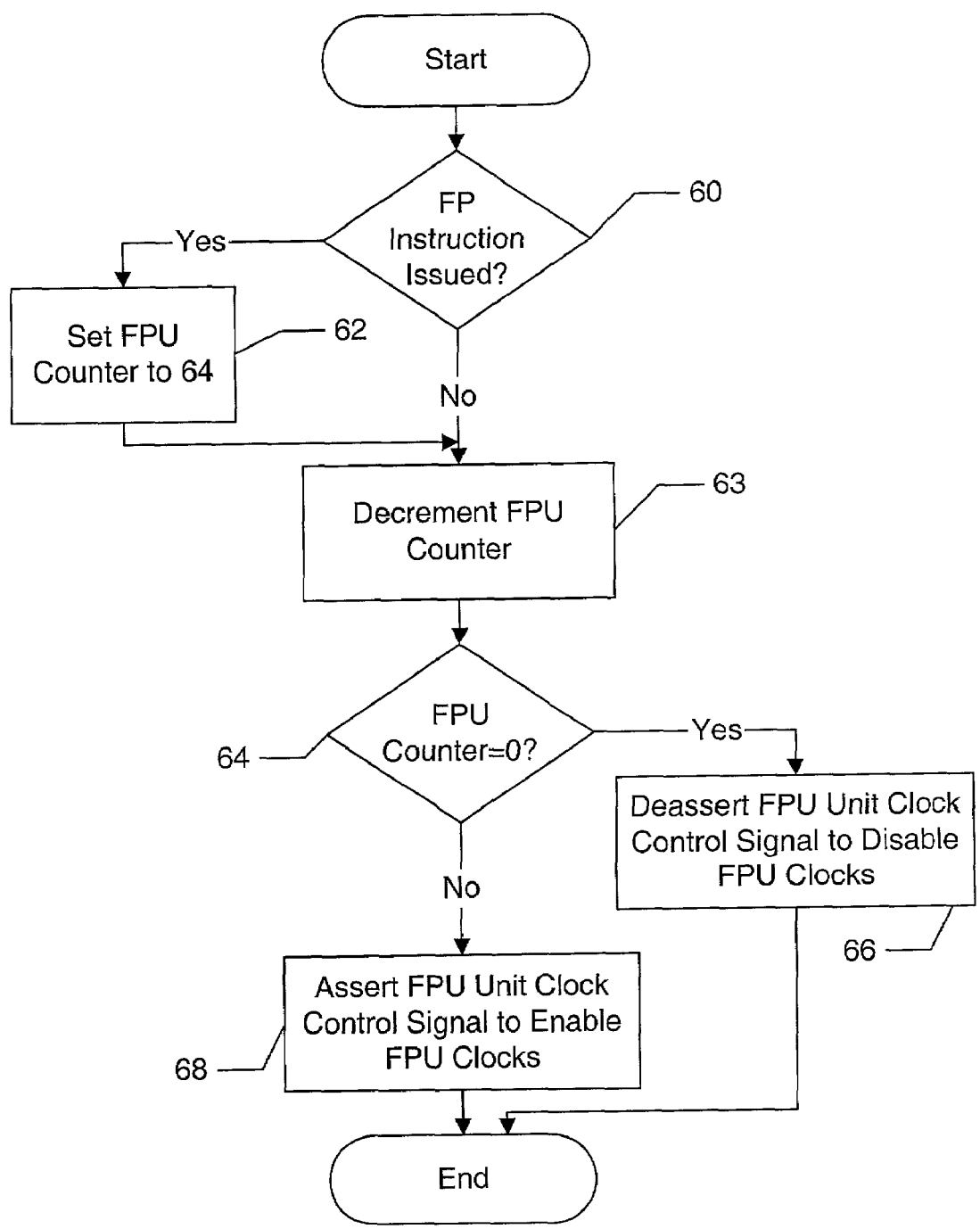
FIG. 3 is a flowchart illustrating operation of one embodiment of a fetch/decode/issue circuit shown in FIG. 1 for a floating point instruction.

Turning now to FIG. 3, a flowchart is shown illustrating operation of one embodiment of the issue circuit 40 for floating point instruction issue and coarse grain level clock gating. Other embodiments are possible and contemplated. While the blocks shown are illustrated in a particular order for ease of understanding, any other order may be used. Furthermore, blocks may be independent and may be performed in parallel by combinatorial logic circuitry in the issue circuit 40. For example, decision blocks 60 and 64 may be independent and may be performed in parallel. Additionally, the decrementing of the FPU counter (block 63) may be independent of the decision blocks 60 and 64.

If a floating point instruction is issued (decision block 60), the issue circuit 40 sets the FPU counter 42 to 64 (block 62). Thus, in this embodiment, the maximum latency of a floating point instruction may be less than or equal to 64 clock cycles. As mentioned above, in other embodiments, the counter may be initialized based on the latency of the actual floating point instruction which is issued, rather than on the maximum latency of any floating point instruction. Additionally, the operation of blocks 60 and 62 may be viewed as reinitializing the FP counter due to the issue of a floating point instruction if the count from a preceding floating point instruction has not yet expired. As mentioned above, the issue circuit 40 decrements the FPU counter 42 each clock cycle (block 63).

If the FPU counter 42 has reached zero (decision block 64), the issue circuit 40 deasserts the FPU unit clock control signal (one of the Unit_Clk_Ctrl signals shown in FIG. 1)

to disable the FPU local clock tree (block 66). There may be separate FPU unit clock control signals for each FPU 24A–24B and separate FPU counters for each FPU 24A–24B, in which case the FPU unit clock control signal corresponding to the FPU counter 42 which has reached zero may be deasserted. Alternatively, there may be a single FPU unit clock control signal used by each FPU 24A–24B and a single FPU counter 42. If the FPU counter 42 has not reached zero (decision block 64), the issue circuit 40 asserts the FPU unit clock control signal to enable the FPU local clock tree (block 68).

Figure 4:
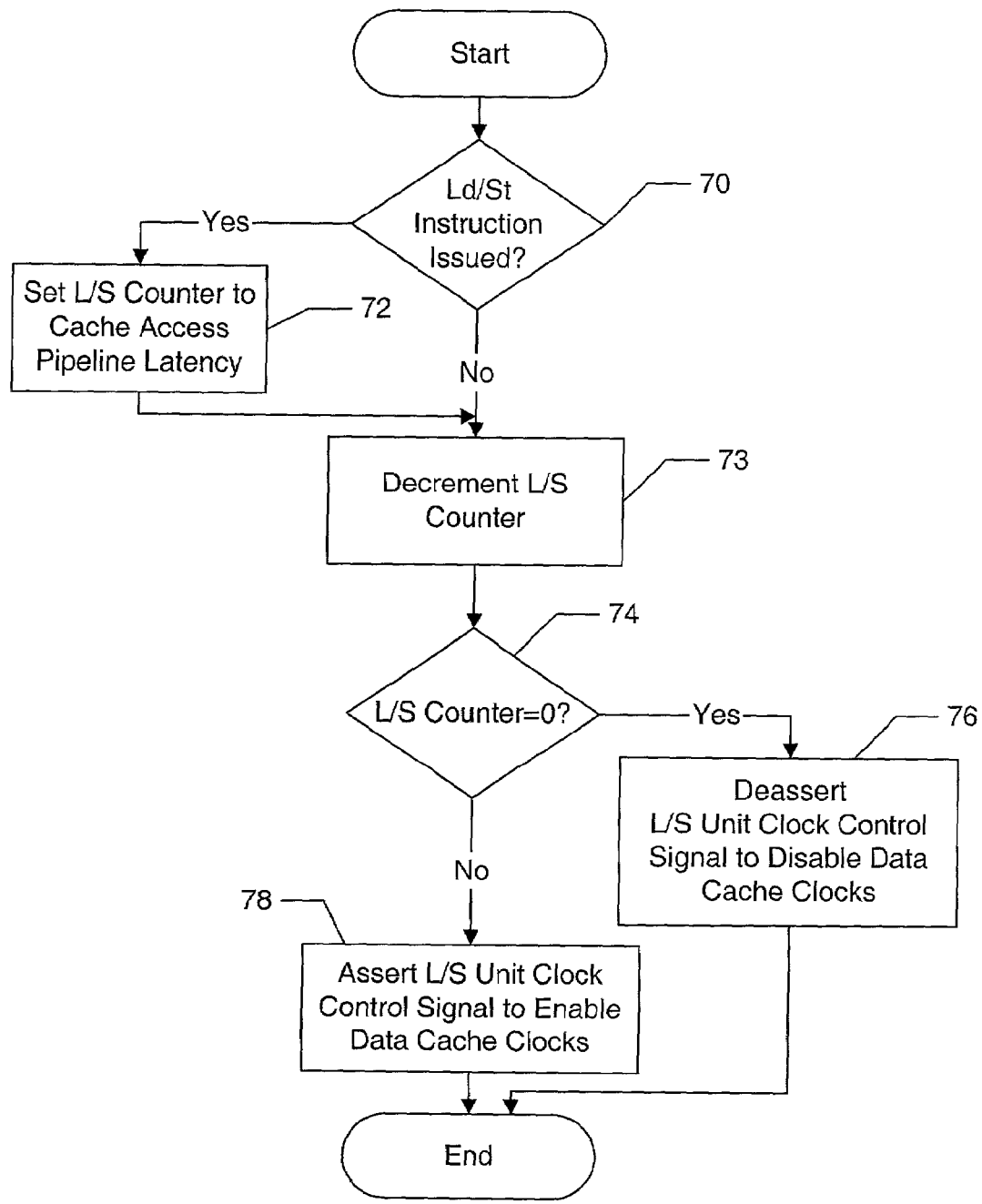
FIG. 4 is a flowchart illustrating operation of one embodiment of a fetch/decode/issue circuit shown in FIG. 1 for a load/store instruction.

Turning next to FIG. 4, a flowchart is shown illustrating operation of one embodiment of the issue circuit 40 for load/store instruction issue and coarse grain level clock gating. Other embodiments are possible and contemplated. While the blocks shown are illustrated in a particular order for ease of understanding, any other order may be used. Furthermore, blocks may be independent and may be performed in parallel by combinatorial logic circuitry in the issue circuit 40. For example, decision blocks 70 and 74 may be independent and may be performed in parallel. Additionally, the decrementing of the L/S counter (block 73) may be independent of the decision blocks 70 and 74.

If a load/store instruction is issued (decision block 70), the issue circuit 40 sets the L/S counter 44 to the cache access pipeline latency (block 72). The cache access pipeline latency maybe the latency until the cache is accessed in the load/store pipeline. Thus, the data cache may be clocked until the cache access for the load/store instruction occurs, and then clocking may be disabled. Additionally, the operation of blocks 70 and 72 may be viewed as reinitializing the L/S counter due to the issue of a load/store instruction if the count from a preceding load/store instruction has not yet expired. As mentioned above, the issue circuit 40 decrements the L/S counter 44 each clock cycle (block 73).

If the L/S counter 44 has reached zero (decision block 74), the issue circuit 40 deasserts the L/S unit clock control signal (one of the Unit_Clk_Ctrl signals shown in FIG. 1) to disable the data cache local clock tree (block 76). If the L/S counter 44 has not reached zero (decision block 74), the issue circuit 40 asserts the L/S unit clock control signal to enable the data cache local clock tree (block 78).

Figure 5:
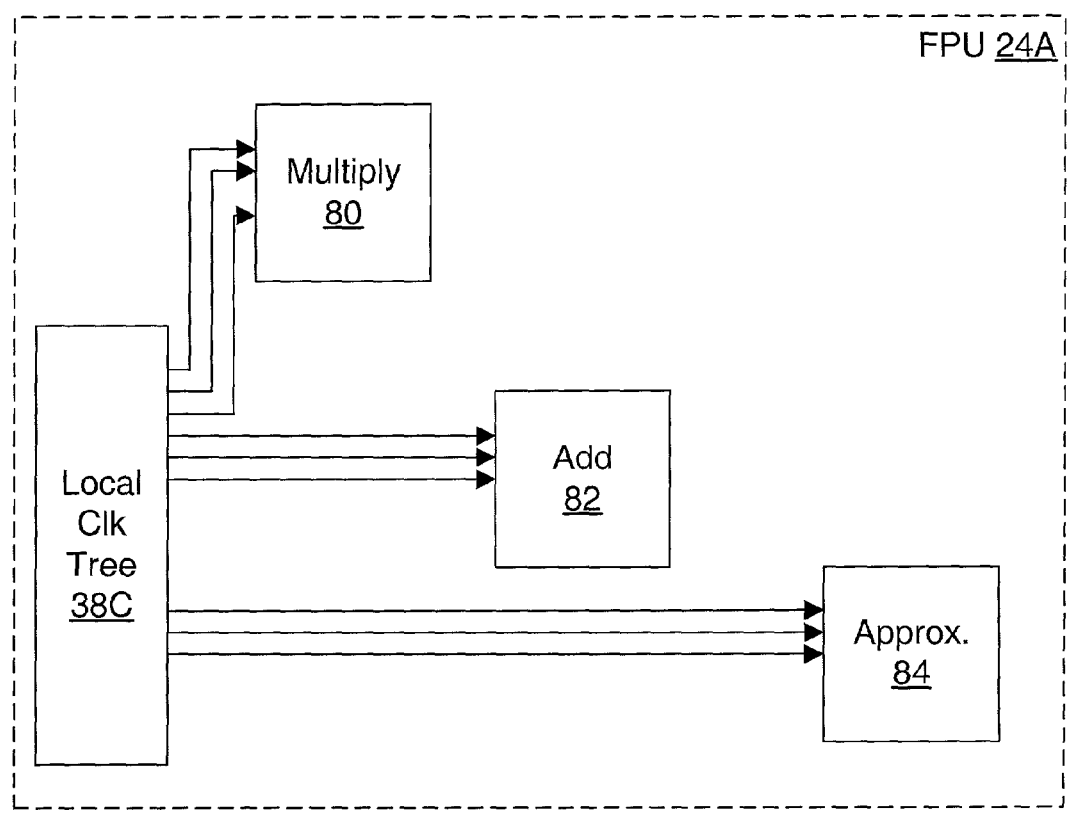
FIG. 5 is a block diagram illustrating a portion of one embodiment of a floating point unit shown in FIG. 1.

Turning now to FIG. 5, a block diagram is show illustrating a portion of one embodiment of the FPU 24A. The FPU 24B may be similar. Other embodiments are possible and contemplated. In the illustrated embodiment, the FPU 24A includes a multiplier subcircuit 80, an adder subcircuit 82, and an approximation subcircuit 84. Each subcircuit is coupled to receive one or more local clock signals from the local clock tree 38C.

Figure 6:
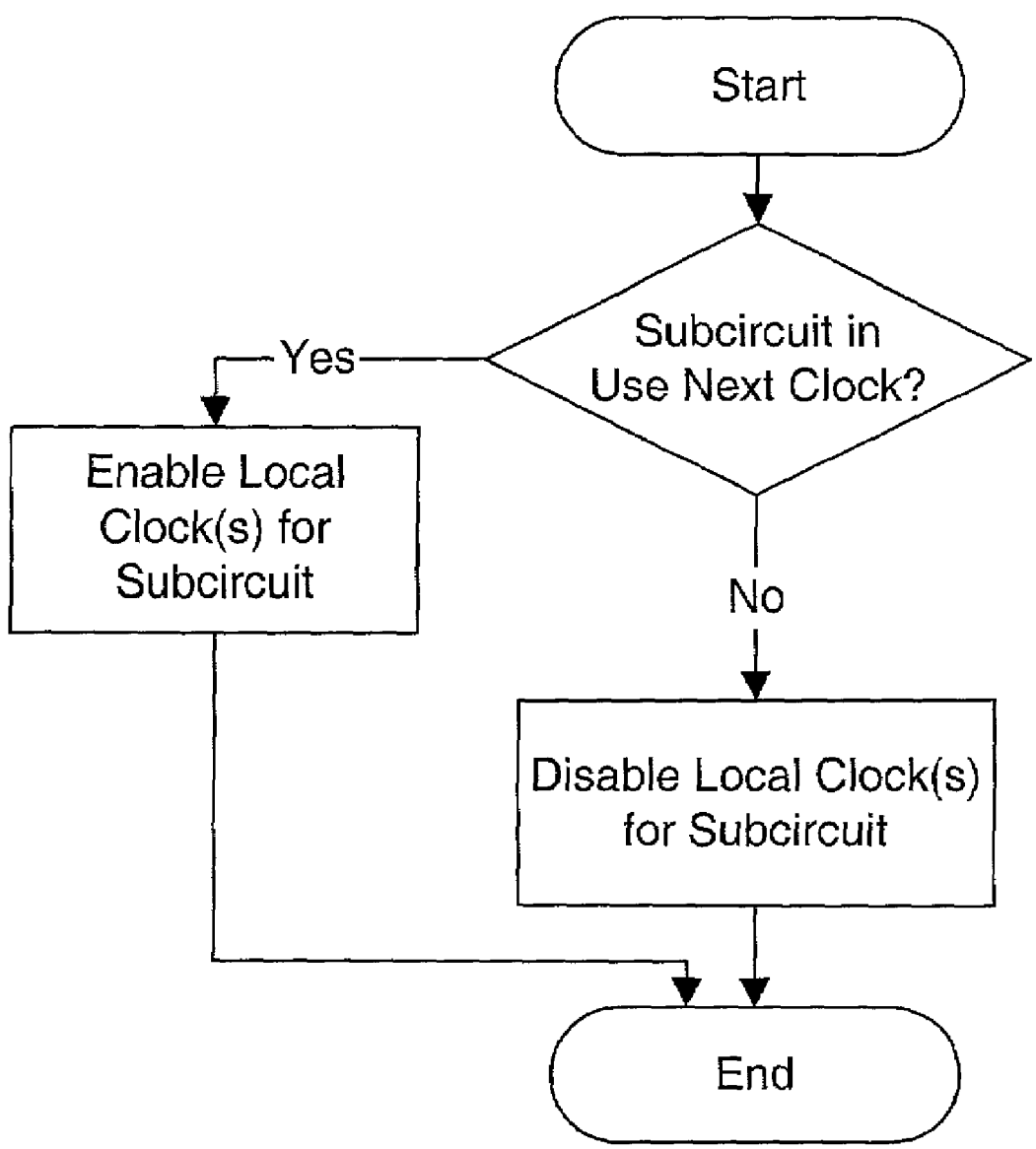
FIG. 6 is a flowchart illustrating local conditional clock generation in one embodiment of the floating point unit shown in FIG. 5.

Generally, the clock gating logic associated with the conditional clock buffer circuits in the local clock tree 38C may monitor activity in each of the subcircuits shown, and may determine, on a clock-cycle by clock-cycle basis, if the subcircuit (or a portion thereof) is active during the next clock cycle. If so, the clock gating logic enables the conditional clock circuits for the subcircuit (or portion of the subcircuit), thus clocking the circuitry. If the subcircuit (or portion) is not active during the next clock cycle, the clock gating logic disables the conditional clock circuits for the subcircuit (or portion), thus holding the clock signal steady. A generalized flowchart illustrating such behavior is shown in FIG. 6, for one embodiment. As used herein, a subcircuit is a circuit which is also considered to be a portion of a larger overall circuit. A circuit may include two or more subcircuits.

While the FPU 24A is used as an example in FIG. 5, any circuit with two or more subcircuits which is supplied by a clock tree may be used in various embodiments. For example, the data cache 30 may be a circuit with multiple subcircuits (e.g. cache banks). The cache banks may be conditionally clocked individually dependent on which bank is accessed by a given load/store instruction. The cache banks may be collectively clocked dependent on whether or not a load/store instruction has been issued and has not reached the cache access stage.

Exemplary Conditional Clock Buffer Circuit

Figure 7:
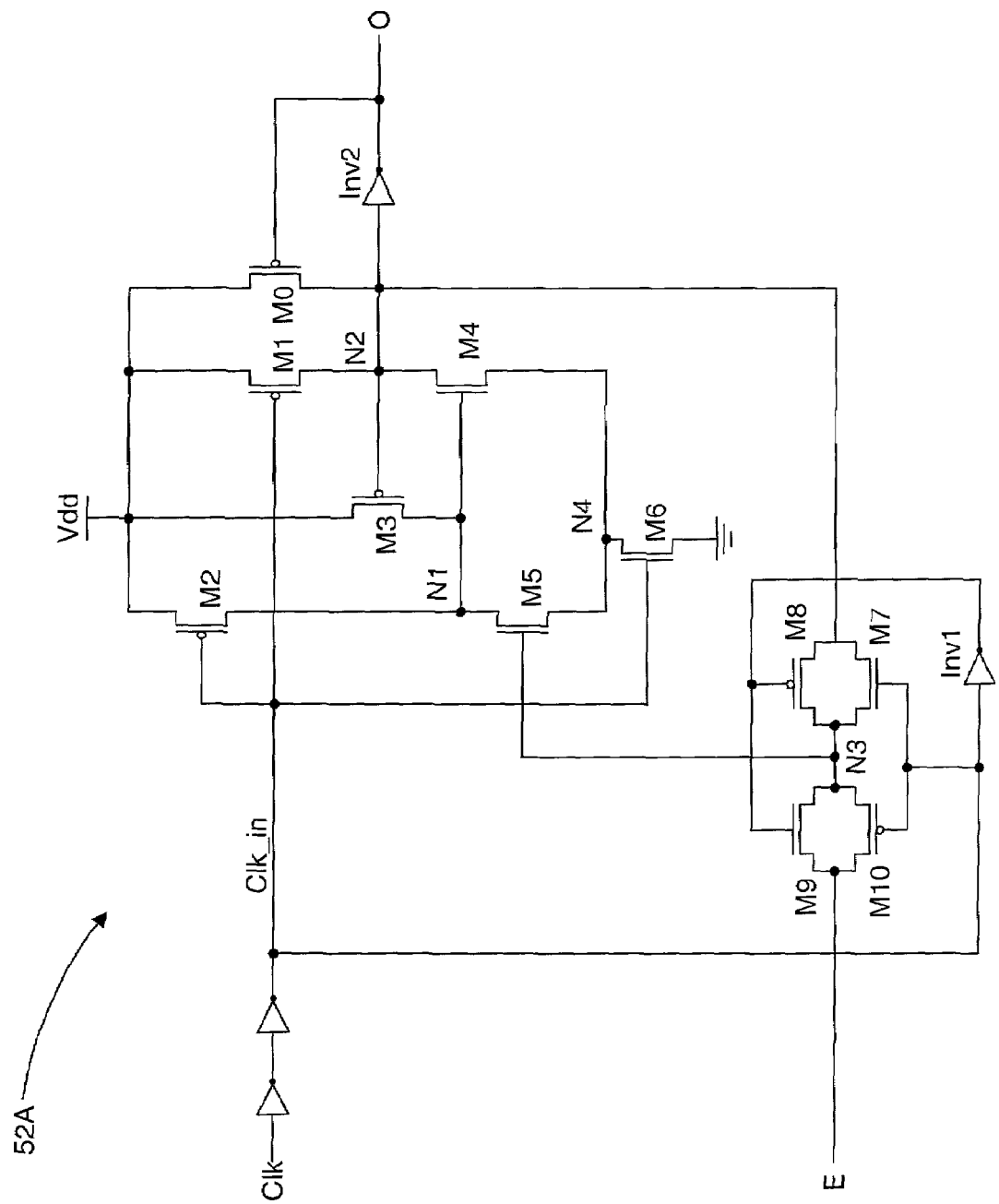
FIG. 7 is a circuit diagram illustrating one embodiment of a conditional clock buffer circuit.

Moving now to FIG. 7, a schematic diagram of one embodiment of a conditional clock buffer circuit 52A is shown. Other conditional clock buffer circuits 52B–52N may be similar. Other embodiments are possible and contemplated. Any type of conditional clock buffer circuit may be used. In the embodiment shown, the conditional clock buffer circuit 52A includes a pair of inverters for receiving the input clock signal (Clk). The inverters provide buffering for the Clk clock signal, producing the clock signal Clk_in. The inverters are optional buffering circuitry and may be eliminated in other embodiments. In some embodiments, the conditional clock buffer circuit 52A may be configured to produce Clk_in from an input clock signal Clk and a second clock signal having a 90° phase shift with respect to the input clock signal (referred to as quadrature clocks). In such embodiments, the clock signal Clk_in may be an exclusive OR of the clock signal Clk and the second clock signal and the clock signal Clk_in may be twice the frequency of the clock signal Clk.

The conditional clock buffer circuit 52A also includes an enable input circuit for receiving an enable. The enable input circuit includes the transistors M7, M8, M9, and M10. In the embodiment shown, the enable signal is passed from the input to node N3 by the first passgate circuit responsive to the low phase of the clock signal. The enable is latched at node N3 responsive to the rising edge of the clock signal. The second passgate circuit may be used to feedback the voltage on the node N2 to the node N3 circuit in order to ensure stability of the node N3 during the high phase of the clock signal Clk_in.

The conditional clock buffer circuit 52A as illustrated in FIG. 7 further includes and inverter Inv2 and the transistors M0, M1, M2, M3, M4, M5, and M6. The transistors M1 and M2 may form a precharge circuit which precharges the nodes N1 and N2 during the low phase of the clock signal Clk_in. Since the node N2 is precharged, the clock signal (O) is also low responsive to the low phase of the clock signal Clk_in.

In response to logical one on the enable (latched at node N3), transistor M5 is activated. Activating transistor M5 may effectively create a short circuit between the gate and source terminals of the transistor M4 (nodes N1 and N4), preventing a voltage drop across those terminals. Since the transistor M4 is deactivated, the node N2 is not drained and thus the clock signal O remains in a low state (the clock signal O is inhibited). The node Ni may be discharged through the combination of the transistors M5 and M6 in response to the high phase of the clock signal Clk_in and the logical one on node N3. Discharging the node N1 may further ensure that the transistor M4 remains deactivated responsive to the asserted condition input signal. If the transistor M4 is deactivated, the stability of the voltage on the node N2 may be provided through the transistor M0. The transistor M0 may be optional and may be deleted in other embodiments.

In response to the enable being a logical zero, the clock signal may propagate through the conditional clock buffer circuit 52A. In the embodiment shown, transistor M5 is deactivated when the enable is a logical zero. Since the node N1 was precharged during the low phase of the clock, the transistor M4 may be activated. In response to the rising edge of the clock signal Clk_in, the transistor M6 is activated and the combination of transistor M4 and M6 may discharge the node N2. Discharging the node N2 causes the inverter Inv2 to charge the clock signal O, providing a rising edge on the clock signal O. The high phase of the clock signal O may continue until the transistor M1 precharges the node N2 in response to the low phase of the clock signal Clk_in. The discharging of the node N2 also activates the transistor M3, which may provide stability for the voltage on the node N1 since the transistors M2 and M5 are deactivated. Transistor M3 may be optional and may be deleted in other embodiments.

System

Figure 8:
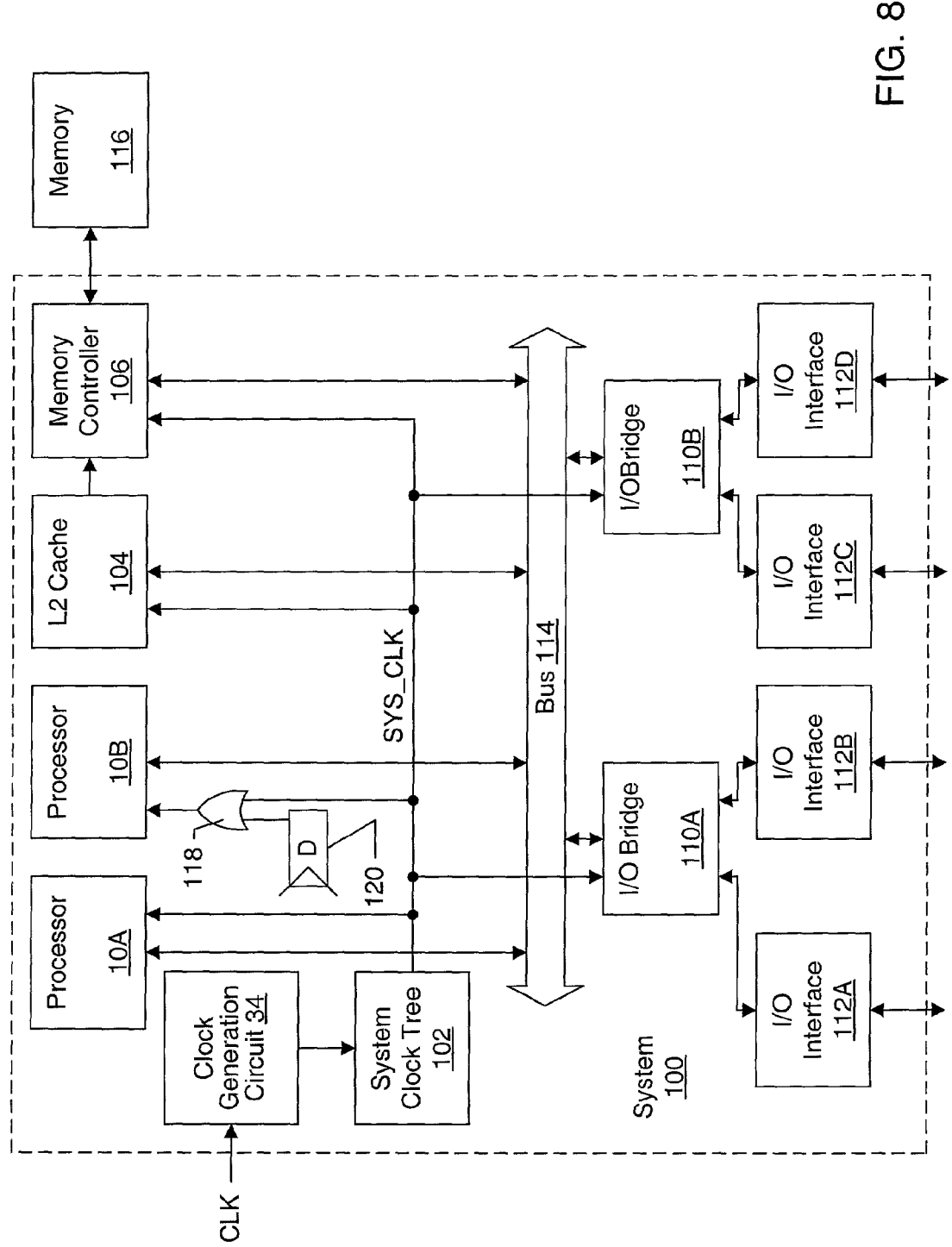
FIG. 8 is a block diagram of one embodiment of a system including one or more processors shown in FIG. 1.

Turning now to FIG. 8, a block diagram of one embodiment of a system 100 is shown. Other embodiments are possible and contemplated. In the embodiment of FIG. 8, the system 100 includes processors 10A–10B, an L2 cache 104, a memory controller 106, a pair of input/output (I/O) bridges 110A–110B, I/O interfaces 112A–112D, the clock generation circuit 34, a system clock tree 102, a logic circuit 18, and a register 120. The system 100 may include a bus 114 for interconnecting the various components of the system 100. As illustrated in FIG. 8, each of the processors 10A–10B, the L2 cache 104, the memory controller 106, and the I/O bridges 110A–110B are coupled to the bus 114. Thus, each of the processors 10A–10B, the L2 cache 104, the memory controller 106, and the I/O bridges 110A–110B may be an agent on bus 114 for the illustrated embodiment. The I/O bridge 110A is coupled to the I/O interfaces 112A–112B, and the I/O bridge 110B is coupled to the I/O interfaces 112C–112D. The L2 cache 104 is coupled to the memory controller 106, which is further coupled to a memory 116. The clock generation circuit 34 is coupled to receive a clock input (CLK) and is coupled to provide a generated clock to the system clock tree 102, which provides a system clock (SYS_CLK) to at least the processor 10A, the logic circuit 118, the L2 cache 104, the memory controller 106, and the I/O bridges 110A–110B. Additionally, clocks may be provided to the I/O interfaces 112A–112D (not shown in FIG. 8). These clocks may be of different frequencies than the system clock, or may be the system clock, in various embodiments. The register 120 is coupled to the logic circuit 118, which is coupled to receive the system clock signal and provide the clock to the processor 10B.

The processors 10A–10B may be designed to any instruction set architecture, and may execute programs written to that instruction set architecture. Exemplary instruction set architectures may include the MIPS instruction set architecture (including the MIPS- 3D and MIPS MDMX application specific extensions), the IA-32 or IA-64 instruction set architectures developed by Intel Corp., the PowerPC instruction set architecture, the Alpha instruction set architecture, the ARM instruction set architecture, or any other instruction set architecture. While the system 100 as shown in FIG. 8 includes two processors, other embodiments may include one processor or more than two processors, as desired.

In one embodiment, each of the processors 10A–10B may be an embodiment of the processor 10 shown in FIG. 1. The processors 10A–10B may omit the clock generation circuit 34 shown in FIG. 1, since the system 100 includes a clock generation circuit 34 for generating the system clock. Thus, the system clock may be provided as the input to the global clock tree 36 in the processor 10A. Similarly, the output of the logic circuit 118 may be provided as the input to the global clock tree 36 in the processor 10B.

In some cases, the processor 10B may be idle in the system 100. In such cases, it may be desirable to gate the clock to the processor 10B to conserve additional power. In the illustrated embodiment, the register 120 may be programmed with a disable bit (D) to disable the clocking of the processor 10B. For example, instructions executing on processor 10A may write the register 120. Thus, the processor 10B may have three levels of clock gating: the processor as a whole, the coarse grain level corresponding to various units in the processor 10B, and the fine grain level.

In the illustrated embodiment, the disable bit (D) may be set to disable clocking (or to gate the clock), and clear to enable clocking. Thus, the logic circuit 118 may comprise an OR gate to OR the disable bit with the system clock to provide a clock input to the processor 10B. If the disable bit is set, the output of the OR gate is a steady logical one. If the disable bit is clear, the system clock passes through to the output of the OR gate. In other embodiments, the disable bit may be clear to disable clocking and set to enable clocking, in which case an AND gate may be used. Moreover, NOR or NAND gates may be used, or any other logic gate or gates, as desired. Any Boolean equivalents of such gates may be used.

Generally, the system clock tree 102 may buffer the system clock for distribution to the various loads (e.g. the processors 10A–10B, the L2 cache 104, the memory controller 106, the bridges 110A–110B, etc.). Similar to the global clock tree 36 shown in FIG. 1, the system clock tree 102 may generally be physically distributed over the system 100 to deliver a plurality of system clock signals at various physical locations.

While the processor 10B may be clock-gated under program control in the illustrated embodiment, other embodiments may use hardware monitoring of the processor 10B to determine if gating the clock to the processor may be performed. In other embodiments, both processors may be gated in the illustrated manner, or any of the other units shown in FIG. 8 may be gated (e.g. the L2 cache 104, the memory controller 106, the I/O bridges 110A–110B, etc.). Any combination of gated and non-gated units may be used.

The L2 cache 104 is a high speed cache memory. The L2 cache 104 is referred to as "L2" since the processors 10A–10B may employ internal level 1 ("L1 ") caches. If L1 caches are not included in the processors 10A–10B, the L2 cache 104 may be an L1 cache. Furthermore, if multiple levels of caching are included in the processors 10A–10B, the L2 cache 104 may be an outer level cache than L2. The L2 cache 104 may employ any organization, including direct mapped, set associative, and fully associative organizations. In one particular implementation, the L2 cache 104 may be a set associative cache (in general N way, N being an integer, although specific 3 way and 4 way embodiments are illustrated below) having 32 byte cache lines.

The memory controller 106 is configured to access the memory 116 in response to memory transactions received on the bus 114. The memory controller 106 receives a hit signal from the L2 cache 104, and if a hit is detected in the L2 cache 104 for a memory transaction, the memory controller 106 does not respond to that memory transaction. Other embodiments may not include the L2 cache 104 and the memory controller 106 may respond to each memory transaction. If a miss is detected by the L2 cache 104, or the memory transaction is non-cacheable, the memory controller 106 may access the memory 116 to perform the read or write operation. The memory controller 106 may be designed to access any of a variety of types of memory. For example, the memory controller 106 may be designed for synchronous dynamic random access memory (SDRAM), and more particularly double data rate (DDR) SDRAM. Alternatively, the memory controller 106 may be designed for DRAM, Rambus DRAM (RDRAM), SRAM, or any other suitable memory device.

The I/O bridges 110A–110B link one or more I/O interfaces (e.g. the I/O interfaces 112A–112B for the I/O bridge 110A and the I/O interfaces 112C–112D for the I/O bridge 110B) to the bus 114. The I/O bridges 110A–110B may serve to reduce the electrical loading on the bus 114 if more than one I/O interface 112A–112B is bridged by that I/O bridge. Generally, the I/O bridge 110A performs transactions on bus 114 on behalf of I/O interfaces 112A–112B and relays transactions targeted at an I/O interface 112A–112B from the bus 114 to that I/O interface 112A–112B. Similarly, the I/O bridge 110B generally performs transactions on the bus 114 on behalf of the I/O interfaces 112C–112D and relays transactions targeted at an I/O interface 112C–112D from the bus 114 to that I/O interface 112C–112D. In one implementation, the I/O bridge 110A may be a bridge to a PCI interface (e.g. the I/O interface 112A) and to a HyperTransport I/O fabric (e.g. I/O interface 112B). Other I/O interfaces may be bridged by the I/O bridge 110B. Other implementations may bridge any combination of I/O interfaces using any combination of I/O bridges. The I/O interfaces 112A–112D may include one or more serial interfaces, Personal Computer Memory Card International Association (PCMCIA) interfaces, Ethernet interfaces (e.g. media access control level interfaces), Peripheral Component Interconnect (PCI) interfaces, HyperTransport interfaces, etc.

The bus 114 may be a split transaction bus, in one embodiment. The bus 114 may employ a distributed arbitration scheme, in one embodiment. In one embodiment, the bus 114 may be pipelined. The bus 114 may employ any suitable signalling technique. For example, in one embodiment, differential signalling may be used for high speed signal transmission. Other embodiments may employ any other signalling technique (e.g. TTL, CMOS, GTL, HSTL, etc.).

It is noted that the system 100 (and more particularly the processors 10A–10B, the L2 cache 104, the memory controller 106, the I/O interfaces 112A–112D, the I/O bridges 110A–110B and the bus 114 may be integrated onto a single integrated circuit as a system on a chip configuration. In another configuration, the memory 116 may be integrated as well. Alternatively, one or more of the components may be implemented as separate integrated circuits, or all components may be separate integrated circuits, as desired. Any level of integration may be used.

It is noted that, while the illustrated embodiment employs a split transaction bus with separate arbitration for the address and data buses, other embodiments may employ non-split transaction buses arbitrated with a single arbitration for address and data and/or a split transaction bus in which the data bus is not explicitly arbitrated. Either a central arbitration scheme or a distributed arbitration scheme may be used, according to design choice. Furthermore, the bus 114 may not be pipelined, if desired. Other embodiments may use other communications media (e.g. packet based transmission, clock-forwarded links, point to point interconnect, etc.).

It is noted that, while FIG. 8 illustrates the I/O interfaces 112A–112D coupled through the I/O bridges 110A–110B to the bus 114, other embodiments may include one or more I/O interfaces directly coupled to the bus 114, if desired.

Carrier Medium

Figure 9:
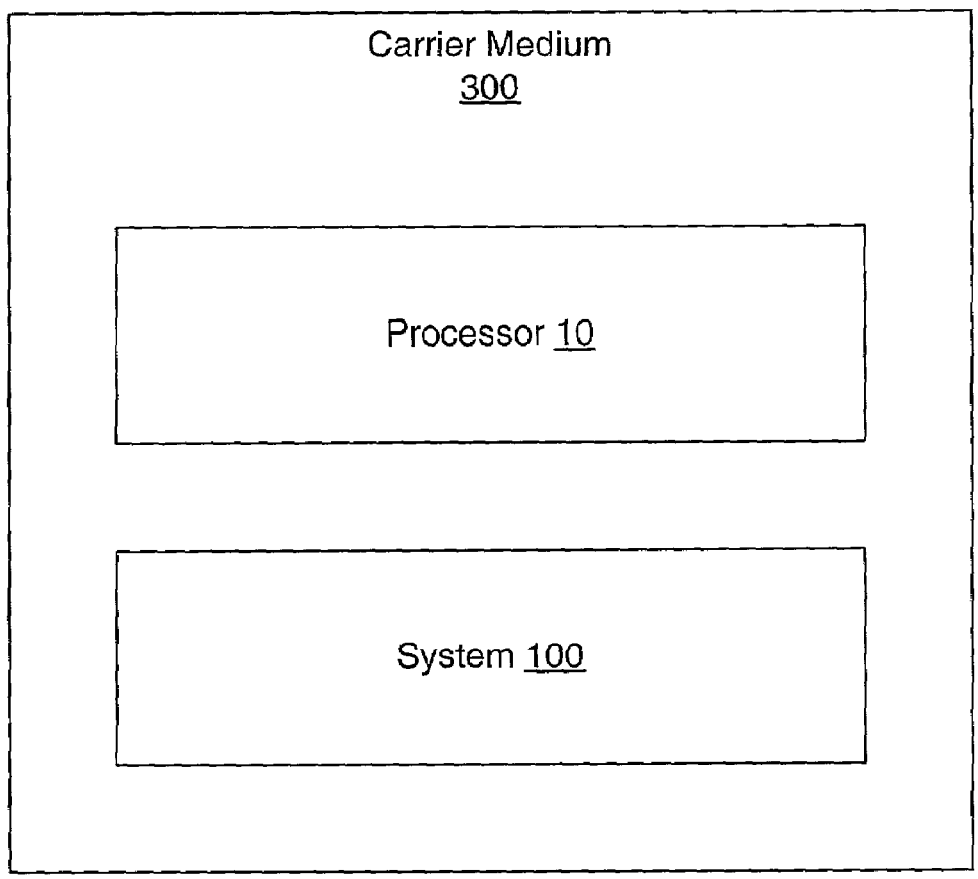
FIG. 9 is a block diagram of one embodiment of a carrier medium.

Turning next to FIG. 9, a block diagram of a carrier medium 300 including one or more data structures representative of the processor 10 and/or the system 100 is shown. Generally speaking, a carrier medium may include storage media such as magnetic or optical media, e.g., disk or CD-ROM, volatile or non-volatile memory media such as RAM (e.g. SDRAM, RDRAM, SRAM, etc.), ROM, etc., as well as transmission media or signals such as electrical, electromagnetic, or digital signals, conveyed via a communication medium such as a network and/or a wireless link.

Generally, the data structure(s) of the processor 10 and/or the system 100 carried on carrier medium 300 may be read by a program and used, directly or indirectly, to fabricate the hardware comprising the processor 10 and/or the system 100. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlist(s) comprising lists of gates from a synthesis library. The netlist(s) comprise a set of gates which also represent the functionality of the hardware comprising the processor 10 and/or the system 100. The netlist(s) may then be placed and routed to produce one or more data set(s) describing geometric shapes to be applied to masks. The masks may then be used in various semiconductor fabrication steps to produce a semiconductor circuit or circuits corresponding to the processor 10 and/or the system 100. Alternatively, the data structure(s) on carrier medium 300 may be the netlist(s) (with or without the synthesis library) or the data set(s), as desired.

While carrier medium 300 carries a representation of the processor 10 and/or the system 100, other embodiments may carry a representation of any portion of processor 10 and/or the system 100, as desired, including a fetch/decode/issue unit 14, an issue circuit 40, an FPU counter 42, an L/S counter 44, one or more load/store units 26A–26B, a data cache 30, one or more FPUs 24A–24B, one or more integer units 22A–22B, one or more local clock trees 38A–38G, a global clock tree 36, a clock generation circuit 34, one or more conditional clock buffer circuits 52A–52N, one or more clock gating logic circuits 54A–54N, the register 120, the logic circuit 118, the system clock tree 102, the processors 10A–10B, the L2 cache 104, the memory controller 106, the bridges 110A–110B, the I/O interfaces 112A–112D, etc.

Numerous variations and modifications will become apparent to those skilled in the art once the above disclosure is fully appreciated. It is intended that the following claims be interpreted to embrace all such variations and modifications.

What is claimed is:

1. A processor comprising:
   an execution circuit configured to execute an instruction, the execution circuit including at least a first subcircuit and a second subcircuit;
   an issue circuit coupled to the execution circuit, wherein the issue circuit is configured to issue an instruction to the execution circuit, the issue circuit including a counter which is initialized to count a latency value of the instruction at issuance of the instruction and to generate a control signal to the execution circuit to control clock gating in the execution unit responsive to the latency value initialized in the counter; and a clocking circuitry to provide a plurality of clocks for the execution circuit, the plurality of clocks including at least a first clock clocking the first subcircuit and at least a second clock clocking the second subcircuit, the clocking circuitry coupled to receive the control signal for collectively conditionally gating the plurality of clocks, and to individually conditionally gate at least some of the plurality of clocks responsive to activity in the respective subcircuits of the execution circuit.

2. The processor as recited in claim 1 wherein the issue circuit is configured to generate the control signal to not gate the plurality of clocks for a particular number of consecutive clock cycles in response to issuing the instruction.

3. The processor as recited in claim 2 wherein the clocking circuit is configured to individually gate the plurality of clocks on a clock cycle by clock cycle basis.

4. The processor as recited in claim 1 wherein the issue circuit is configured to reinitialize the counter responsive to issuing a second instruction to the execution circuit.

5. The processor as recited in claim 1 wherein the issue circuit is configured to decrement the counter each clock cycle, and wherein the issue circuit is configured to continue generating the control signal to not gate the plurality of clocks responsive to the counter having a non-zero value.

6. The processor as recited in claim 1 wherein the issue circuit is configured to initialize the counter based on a latency of the execution circuit in executing the instruction.

7. The processor as recited in claim 6 wherein the counter is initialized to a number of clock cycles greater than or equal to the latency value of the instruction.

8. The processor as recited in claim 6 wherein the counter is initialized to a number of clock cycles equal to the latency value of the instruction.

9. The processor as recited in claim 1 wherein the execution circuit is a floating point unit.

10. The processor as recited in claim 9 wherein the first subcircuit includes an adder circuit and wherein the second subcircuit includes a multiplier circuit.

11. The processor as recited in claim 10 wherein the floating point unit further includes an approximation circuit clocked by at least a third clock of the plurality of clocks.

12. The processor as recited in claim 1 wherein the execution circuit is to execute a load/store instruction.

13. The processor as recited in claim 1 wherein the first subcircuit includes a load/store unit and wherein the second subcircuit includes a data cache.

14. An apparatus comprising:

a first circuits, including at least a first subcircuit and a second subcircuit, to execute an instruction and;

second circuit coupled to issue an instruction to the first circuit, wherein the second circuit includes a counter circuit which is initialized to count a latency value of the instruction at issuance of the instruction and to generate a control signal to the first circuit to control clock gating in the first circuit responsive to the latency value initialized in the counter circuit; and a clocking circuit to receive a clock input and the control signal, and to output a plurality of clock outputs, in which a first clock output of the plurality of clock outputs is coupled to the first subcircuit and a second clock output of the plurality of clock outputs is coupled to the second subcircuit, wherein the plurality of clock outputs are collectively conditionally gated from the clock input responsive to the control signal and wherein at least some of the plurality of clock outputs are individually conditionally gated from the clock input further responsive to activity in the respective subcircuits.

15. The apparatus as recited in claim 14 wherein the clocking circuit includes a plurality of levels of clock buffer circuitry, and wherein a first level of the plurality of levels includes one or more logic gates which combine the clock input and the control signal input.

16. The apparatus as recited in claim 15 wherein a number of levels is four.

* * * * *

UNITED STATES PATENT AND TRADEMARK OFFICE
CERTIFICATE OF CORRECTION

| | |
|---|---|
| PATENT NO. | : 6,971,038 B2 |
| APPLICATION NO. | : 10/061695 |
| DATED | : November 29, 2005 |
| INVENTOR(S) | : Sribalan Santhanam et al. |

It is certified that error appears in the above-identified patent and that said Letters Patent is hereby corrected as shown below:

Column 16, line 11, in Claim 14: replace "circuits" with --circuit--.

Column 16, line 13, in Claim 14: replace "second circuit" with --a second circuit--.

Signed and Sealed this

Second Day of December, 2008

JON W. DUDAS
*Director of the United States Patent and Trademark Office*